United States Patent
Guo et al.

(10) Patent No.: US 11,172,399 B2
(45) Date of Patent: Nov. 9, 2021

(54) DEFAULT QUALITY OF SERVICE (QOS) CONTROL METHOD AND DEVICE

(71) Applicant: China Academy of Telecommunications Technology, Beijing (CN)

(72) Inventors: Yali Guo, Beijing (CN); Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/961,683

(22) PCT Filed: Jan. 4, 2019

(86) PCT No.: PCT/CN2019/070509
§ 371 (c)(1),
(2) Date: Jul. 12, 2020

(87) PCT Pub. No.: WO2019/137315
PCT Pub. Date: Jul. 18, 2019

(65) Prior Publication Data
US 2020/0389811 A1    Dec. 10, 2020

(30) Foreign Application Priority Data
Jan. 12, 2018    (CN) .......................... 201810031281.5

(51) Int. Cl.
*H04W 28/02* (2009.01)
*H04W 76/20* (2018.01)
(Continued)

(52) U.S. Cl.
CPC ....... *H04W 28/0268* (2013.01); *H04M 15/66* (2013.01); *H04W 76/20* (2018.02); *H04W 76/10* (2018.02)

(58) Field of Classification Search
None
See application file for complete search history.

(56) References Cited

U.S. PATENT DOCUMENTS

2017/0317894 A1  11/2017  Dao et al.
2017/0332282 A1  11/2017  Dao
(Continued)

FOREIGN PATENT DOCUMENTS

CN    102577502 A    7/2012
WO    2017192791 A1  11/2017

OTHER PUBLICATIONS

3GPP TS 23.501 V15.0.0; 3rd Generation Partnership Project;Technical Specification Group Services and System Aspects;System Architecture for the 5G System; Stage 2 (Release 15); total 181 pages, Dec. 2017.

(Continued)

*Primary Examiner* — Jutai Kao
(74) *Attorney, Agent, or Firm* — Kilpatrick Townsend & Stockton, LLP

(57) ABSTRACT

A default quality of service (QoS) control method and device for solving the problem in the prior art that there is no solution for generating a default QoS rule for a NextGen network. In embodiments of the present disclosure, an SMF entity determines a target PCC rule from at least one PCC rule sent by a PCF entity; the SMF entity generates, according to the target PCC rule, a default QoS rule corresponding to a PDU session, and sends the default QoS rule to a UE. According to the embodiments of the present disclosure, because the connectivity and QoS control of the PDU session are ensured, and the target PCC rule used by the SMF to generate the default QoS rule is determined by the PCF entity for a PDU session of the UE, the precise control (Continued)

for a specific UE and a specific PDU session is implemented, and the system performance is further improved.

18 Claims, 7 Drawing Sheets

(51) Int. Cl.
*H04M 15/00* (2006.01)
*H04W 76/10* (2018.01)

(56) References Cited

U.S. PATENT DOCUMENTS

| | | | |
|---|---|---|---|
| 2017/0359768 | A1 | 12/2017 | Byun et al. |
| 2019/0109721 | A1* | 4/2019 | Qiao ........................ H04L 47/24 |
| 2019/0207778 | A1* | 7/2019 | Qiao ........................ H04M 15/61 |
| 2020/0015294 | A1* | 1/2020 | Xin ......................... H04W 36/08 |
| 2020/0187043 | A1* | 6/2020 | Xin ......................... H04W 28/0268 |
| 2020/0280562 | A1* | 9/2020 | Salkintzis ............ H04L 65/1063 |
| 2020/0374948 | A1* | 11/2020 | Pan ......................... H04W 28/12 |
| 2020/0404534 | A1* | 12/2020 | Wu ......................... H04W 28/0268 |

OTHER PUBLICATIONS

3GPP TS 23.503 V15.0.0; 3rd Generation Partnership Project;Technical Specification Group Services and System Aspects;Policy and Charging Control Framework for the 5G System; Stage 2 (Release 15); total 56 pages; Dec. 2017.

Huawei et al.,"TS23.501: Clarification for the default QoS flow, notification control and 5QI", SA WG2 Meeting #122Bis, Aug. 21-25, 2017, Sophia Antipolis, France, total 13 pages,S2-175610.

Ericsson, "Updating "QoS Flow of default QoS rule", and clean up", SA WG2 Meeting #124, Nov. 27,-Dec. 1, 2017, Reno, Nevada, USA, total 12 pages, S2-178576.

* cited by examiner

DEFAULT QUALITY OF SERVICE (QOS) CONTROL METHOD AND DEVICE

The present application is a US National Stage of International Application No. PCT/CN2019/070509, filed Jan. 4, 2019, which claims priority to Chinese Patent Application No. 201810031281.5, filed with the Chinese Patent Office on Jan. 12, 2018 and entitled "Default Quality of Service (QoS) Control Method and Device", both of which are hereby incorporated by reference in their entireties.

FIELD

The disclosure relates to the field of wireless communication technologies, and particularly to a method and device for a default quality of service control.

BACKGROUND

In the next generation (NextGen) network, the network architecture has undergone major changes compared to the existing network architecture. In the NextGen network architecture as shown in FIG. 1, the UE (User Equipment) is a user terminal, the AN (Access Network) is an access network device (e.g., base station), the UPF (User Plane Function) entity is a user plane anchor, the AMF (Access and Mobility Management Function) entity and SMF (Session Management Function) entity are control plane network nodes, where the AMF entity is responsible for mobility management and is connected to the UE and AN, and the SMF entity is responsible for session management and is connected to the UPF entity; and the PCF (Policy Control Function) entity belongs to the PCC (Policy and Charging Control) system and is responsible for policy control. The non-access stratum messages between the UE and the AMF entity are transparently transmitted through the AN, and the session management messages between the UE and the SMF entity are transparently transmitted through the AN and the AMF entity.

After the UE accesses the network, the network side establishes one or more PDUs (Protocol Data Units) for the UE for data transmission. In order to maintain the connectivity of the network and the most basic quality of service control, when each PDU session is established, the network side needs to establish a default QoS (Quality of Service) flow for the PDU session; and the network side further needs configure the associated default QoS rule for the default QoS flow, so that the UE may match the uplink data with the default QoS rule and then transmit it through the default QoS flow. However, there is no solution for generating a default QoS rule for the NextGen network at present.

SUMMARY

The disclosure provides a method and device for a default quality of service control, to solve the problem in the prior art that there is no solution for generating a default QoS rule for the NextGen network.

Based on the above problem, a first method for a default QoS control according to an embodiment of the disclosure includes:

determining, by an SMF entity, a target PCC rule from at least one PCC rule sent by a PCF entity; and the PCC rule belongs to a PDU session established for a UE;

generating, by the SMF entity, a default QoS rule corresponding to the PDU session according to the target PCC rule, and sending the default QoS rule to the UE.

A second method for a default QoS control according to an embodiment of the disclosure includes:

determining, by a PCF entity, at least one PCC rule corresponding to a PDU session established for a UE;

sending, by the PCF entity, the at least one PCC rule to an SMF entity, so that the SMF entity determines a target PCC rule from the at least one PCC rule and generates a default QoS rule corresponding to the PDU session according to the target PCC rule.

An embodiment of the disclosure provides a first SMF entity, including: a processor and a memory;

and the processor is configured to read a program in the memory and perform:

determining a target PCC rule from at least one PCC rule sent by a PCF entity, and the PCC rule belongs to a PDU session established for a UE; generating a default QoS rule corresponding to the PDU session according to the target PCC rule, and sending the default QoS rule to the UE.

An embodiment of the disclosure provides a first PCF entity, including: a processor and a memory;

and the processor is configured to read a program in the memory and perform:

determining at least one PCC rule corresponding to a PDU session established for a UE; and sending the at least one PCC rule to an SMF entity, so that the SMF entity determines a target PCC rule from the at least one PCC rule and generates a default QoS rule corresponding to the PDU session according to the target PCC rule.

A second SMF entity provided by an embodiment of the disclosure includes:

a first determining device configured to determine a target PCC rule from at least one PCC rule sent by a PCF entity; and the PCC rule belongs to a PDU session established for a UE;

a first generating device configured to generate a default QoS rule corresponding to the PDU session according to the target PCC rule, and send the default QoS rule to the UE.

A second PCF entity provided by an embodiment of the disclosure includes:

a second determining device configured to determine at least one PCC rule corresponding to a PDU session established for a UE;

a first sending device configured to send the at least one PCC rule to an SMF entity, so that the SMF entity determines a target PCC rule from the at least one PCC rule and generates a default QoS rule corresponding to the PDU session according to the target PCC rule.

An embodiment of the disclosure provides a computer readable storage medium storing a computer program that, when executed by a processor, cause the processor to perform the steps by the SMF entity or perform the steps performed by the SMF entity.

In the embodiments of the disclosure, the SMF entity receives at least one PCC rule sent by the PCF entity and determines the target PCC rule from the at least one PCC rule, the SMF entity generates the default QoS rule corresponding to the PDU session according to the target PCC rule, and the UE can transmit the uplink data through the default QoS flow according to the default QoS rule, to ensure the connectivity and the quality of service control of the PDU session; and the target PCC rule used by the SMF to generate the default QoS rule is determined by the PCF entity for a PDU session of the UE, to implement the precise control of the specific UE and specific PDU session, and further improve the system performance.

A third method for a default QoS control provided by an embodiment of the disclosure includes:

receiving, by an SMF entity, a session level parameter including third packet filter information sent by a PCF entity; and the session level parameter belongs to a PDU session established for a UE;

generating, by the SMF entity, a default QoS rule corresponding to the PDU session according to the session level parameter, and sending the default QoS rule to the UE.

A fourth method for a default QoS control provided by an embodiment of the disclosure includes:

determining, by a PCF entity, a session level parameter including third packet filter information and corresponding to a PDU session established for a UE;

sending, by the PCF entity, the session level parameter to an SMF entity, so that the SMF entity generates a default QoS rule corresponding to the PDU session according to the session level parameter.

An embodiment of the disclosure provides a third SMF entity, including: a processor and a memory;

and the processor is configured to read a program in the memory and perform:

receiving a session level parameter including third packet filter information sent by a PCF entity, and the session level parameter belongs to a PDU session established for a UE; generating a default QoS rule corresponding to the PDU session according to the session level parameter, and sending the default QoS rule to the UE.

An embodiment of the disclosure provides a third PCF entity, including: a processor and a memory;

and the processor is configured to read a program in the memory and perform:

determining a session level parameter including third packet filter information and corresponding to a PDU session established for a UE; and sending the session level parameter to an SMF entity, so that the SMF entity generates a default QoS rule corresponding to the PDU session according to the session level parameter.

A fourth SMF entity provided by an embodiment of the disclosure includes:

a receiving device configured to receive a session level parameter including third packet filter information sent by a PCF entity; and the session level parameter belongs to a PDU session established for a UE;

a second generating device configured to generate a default QoS rule corresponding to the PDU session according to the session level parameter, and send the default QoS rule to the UE.

A fourth PCF entity provided by an embodiment of the disclosure includes:

a third determining device configured to determine a session level parameter including third packet filter information and corresponding to a PDU session established for a UE;

a second sending device configured to send the session level parameter to an SMF entity, so that the SMF entity generates a default QoS rule corresponding to the PDU session according to the session level parameter.

An embodiment of the disclosure provides a computer readable storage medium storing a computer program that, when executed by a processor, cause the processor to perform the steps by the SMF entity or the steps by the SMF entity.

In the embodiments of the disclosure, the SMF entity receives the session level parameter including the third packet filter information sent by the PCF entity and generates the default QoS rule corresponding to the PDU session according to the session level parameter including the third packet filter information, and the UE can transmit the uplink data through the default QoS flow according to the default QoS rule, to ensure the connectivity and the quality of service control of the PDU session; and the session level parameter used by the SMF to generate the default QoS rule is determined by the PCF entity for a PDU session of the UE, to implement the precise control of the specific UE and specific PDU session, and further improve the system performance.

DETAILED DESCRIPTION

In the embodiments of the disclosure, the SMF entity determines a target PCC rule from at least one PCC rule sent by the PCF entity; and the SMF entity generates a default QoS rule corresponding to a PDU session according to the target PCC rule and sends the default QoS rule to a UE.

The PCC rule belongs to a PDU session established for the UE.

In the embodiments of the disclosure, the SMF entity receives at least one PCC rule sent by the PCF entity and determines the target PCC rule from the at least one PCC rule, the SMF entity generates the default QoS rule corresponding to the PDU session according to the target PCC rule, and the UE can transmit the uplink data through the default QoS flow according to the default QoS rule, to ensure the connectivity and the quality of service control of the PDU session. And the target PCC rule used by the SMF to generate the default QoS rule is determined by the PCF entity for a PDU session of the UE, to implement the precise control of the specific UE and specific PDU session, and further improve the system performance.

In the following description process, the illustration is performed from the cooperative implementations of the SMF entity side and the PCF entity side, but this does not mean that they must cooperate with each other to implement. In fact, when the SMF entity side and the PCF entity side implement separately, the problems that exist respectively on the SMF entity side and the PCF entity side are also be solved, but the better technical effect may be obtained when they are used in combination.

Figure 1:
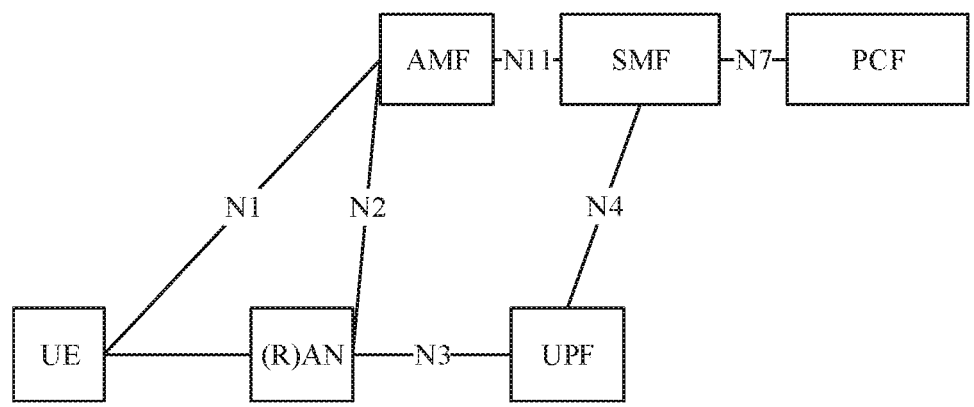
FIG. 1 is a schematic structural diagram of the NextGen network architecture in the background art.
Figure 2:
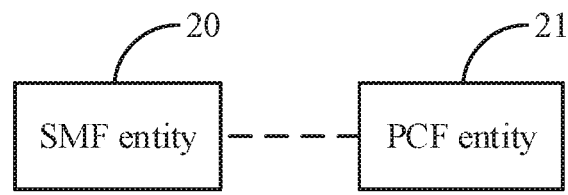
FIG. 2 is a schematic structural diagram of a first system for a default QoS control according to an embodiment of the disclosure.

As shown in FIG. 2, a first default QoS control system according to an embodiment of the disclosure includes the followings.

An SMF entity 20 is configured to determine a target PCC rule from at least one PCC rule sent by a PCF entity, generate a default QoS rule corresponding to a PDU session according to the target PCC rule, and send the default QoS rule to a UE; and the PCC rule belongs to the PDU session established for the UE.

A PCF entity 21 is configured to determine at least one PCC rule corresponding to the PDU session established for the UE; and send the at least one PCC rule to the SMF entity, so that the SMF entity determines the target PCC rule from the at least one PCC rule and generates the default QoS rule corresponding to the PDU session according to the target PCC rule.

It should be noted that the process for a default QoS control in this embodiment of the disclosure is performed independently for each PDU session of the UE, and the process for a default QoS control occurs in the process of establishing the UE's PDU session, or the PCF entity determines to modify the default QoS rule of the PDU session after the establishment of the PDU session is completed.

When the process for a default QoS control occurs in the process of establishing the UE's PDU session, and after the PCF entity receives the policy association establishment request between the SMF entity and the PCF entity, the PCF entity generates at least one PCC rule corresponding to the PDU session, and sends the at least one generated PCC rule to the SMF entity.

After the establishment of the PDU session is completed, and when the PCF entity determines that a part or all of the parameters in the default QoS rule need to be modified, the PCF entity generates at least one PCC rule corresponding to the PDU session, and sends the at least one generated PCC rule to the SMF entity.

In one embodiment, the PCC rule includes a part or all of: a first 5QI (5G QoS Indicator), a first ARP (Allocation and Retention Priority), first packet filter information, first priority information.

It is should be noted that the at least one PCC rule sent by the PCF entity to the SMF entity in the embodiment of the disclosure includes a target PCC rule, and the SMF entity generates the default QoS rule corresponding to the PDU session according to the target PCC rule.

The target PCC rule includes a part or all of: a first 5QI, a first ARP, first packet filter information, first priority information.

When generating the target PCC rule corresponding to a PDU session of the UE, the PCF entity needs to determine the first 5QI, first ARP, first packet filter information, and first priority information in the target PCC rule.

The first 5QI and the first ARP in the target PCC rule may be determined by the existing methods, which will not be described in detail here.

The first priority information in the target PCC rule is configured by the PCF entity, and in the at least one PCC rule corresponding to the PDU session generated by the PCF entity, the first priority information of the target PCC rule is set to the lowest.

When determining the first packet filter information in the target PCC rule, the PCF entity determines it according to a part or all of: an identifier of the UE, the DNN (Data Network Name) information accessed by the PDU session, the subscription-related information of the UE, and the data model prediction information of the UE. The identifier of the UE is sent from the SMF entity to the PCF entity; the subscription-related information of the UE is obtained by the PCF entity from the operator's database; and the data model prediction information of the UE is obtained by the PCF entity from the operator's data analysis network element, for example, the data model prediction information of the UE is the UE mobile prediction model, UE application usage model, etc.

In an embodiment of the disclosure, after receiving the at least one PCC rule sent by the PCF entity, the SMF entity needs to determine the target PCC rule from the at least one PCC rule. In a specific implementation, the SMF entity may determine the target PCC rule in the following three ways.

In a first way: the SMF entity determines the PCC rule carrying the default indication information in the at least one PCC rule as the target PCC rule.

In the first way, when the PCF entity generates at least one PCC rule corresponding to the PDU session, the PCF entity adds the default indication information to one of the at least one PCC rule and sends the PCC rule including the default indication information and other PCC rules not including the default indication information to the SMF entity.

After receiving the at least one PCC rule sent by the PCF entity, the SMF entity determines the PCC rule including the default indication information in the at least one PCC rule as the target PCC rule.

For example, the PCF entity generates four PCC rules corresponding to the PDU session, that is PCC rule 1, PCC rule 2, PCC rule 3, and PCC rule 4; and the PCF entity adds the default indication information "A" in the PCC rule 2. After receiving the four PCC rules corresponding to the PDU session sent by the PCF entity, the SMF entity determines the PCC rule 2 carrying the default indication information "A" as the target PCC rule.

In a second way: the SMF entity determines the PCC rule with the lowest priority in the at least one PCC rule as the target PCC rule.

In the second way, when the PCF entity generates at least one PCC rule corresponding to the PDU session, the PCF entity sends at least one PCC rule including the first priority information to the SMF entity.

It should be noted that each PCC rule generated by the PCF entity includes the first priority information.

After receiving the at least one PCC rule sent by the PCF entity, the SMF entity determines the PCC rule with the lowest priority as the target PCC rule by comparing the first priority information in each PCC rule according to the first priority information included in each PCC rule.

In a third way, the SMF entity determines the PCC rule in which the first type of information is same as the session level parameter as the target PCC rule.

In the third way, before the PCF entity sends the at least one PCC rule to the SMF entity, the PCF entity determines the session level parameter corresponding to the PDU session; and when the PCF entity sends the at least one PCC rule to the SMF entity, the PCF entity also sends the session level parameter to the SMF entity.

It should be noted that, in this embodiment of the disclosure, the PCF entity may send the session level parameter corresponding to the PDU session and the at least one PCC rule in the same message, or send the session level parameter corresponding to the PDU session and the at least one PCC rule respectively through different messages. The specific sending method is not limited.

Correspondingly, the SMF entity receives the session level parameter sent by the PCF entity.

The SMF entity determines the target PCC rule in the following way.

The SMF entity determines the first type of information corresponding to the session level parameter in each PCC rule; and determines the PCC rule in which the first type of information is same as the session level parameter as the target PCC rule.

In one embodiment, the session level parameter is a second 5QI and/or a second ARP.

Correspondingly, the SMF entity determines the first 5QI and/or the first ARP in each PCC rule as the first type of information.

Specifically, when the session level parameter is the second 5QI and the second ARP, the SMF entity determines the first 5QI and the first ARP in each PCC rule as the first type of information.

The target PCC rule determined by the SMF entity from the at least one PCC rule satisfies the following condition: the first 5QI in the target PCC rule is the same as the second 5QI, and the first ARP in the target PCC rule is the same as the second ARP.

When the session level parameter is the second 5QI, the SMF entity determines the first 5QI in each PCC rule as the first type of information.

The target PCC rule determined by the SMF entity from the at least one PCC rule satisfies the following condition: the first 5QI in the target PCC rule is the same as the second 5QI.

When the session level parameter is the second ARP, the SMF entity determines the first ARP in each PCC rule as the first type of information.

The target PCC rule determined by the SMF entity from the at least one PCC rule satisfies the following condition: the first ARP in the target PCC rule is the same as the second ARP.

In an embodiment of the disclosure, after the SMF entity receives the at least one PCF rule sent by the PCF entity, and before the SMF entity generates the default QoS rule corresponding to the PDU session, the SMF entity determines the QFI (QoS Flow Identify) of the default QoS flow allocated for the PDU session.

Specifically, if the SMF entity generates the default QoS rule corresponding to the PDU session in the process of establishing the PDU session for the UE, the SMF entity allocates the QFI of the default QoS flow for the PDU session.

If the SMF entity modifies the default QoS rules corresponding to the PDU session after the establishment of the UE's PDU session is completed, the SMF entity determines the QFI of the default QoS flow allocated for the PDU session in the PDU session establishment process.

In one embodiment, the SMF entity generates the default QoS rule corresponding to the PDU session according to the QFI of the default QoS flow and the target PCC rule.

The default QoS rule includes a part or all of: a third 5QI, a third ARP, second packet filter information, second priority information, QFI of default QoS flow.

In an implementation, the SMF entity generates the default QoS rule corresponding to the PDU session in a part or all of the following ways:

in a first way: the SMF entity determines the first 5QI in the target PCC rule as the third 5QI in the default QoS rule;

in a second way: the SMF entity determines the first ARP in the target PCC rule as the third ARP in the default QoS rule;

in a third way: the SMF entity determines the first packet filter information in the target PCC rule as the second packet filter information in the default QoS rule;

in a fourth way: the SMF entity determines the first priority information in the target PCC rule as the second priority information in the default QoS rule;

in a fifth way: the SMF entity determines the QFI of the default QoS flow as the QFI of the default QoS flow in the default QoS rule.

If the default QoS rule includes the second packet filter information, the second priority information, the QFI of the default QoS flow, the SMF entity generates the default QoS rule corresponding to the PDU session in the above third, fourth and fifth ways.

Specifically, the SMF entity determines the first packet filter information in the target PCC rule as the second packet filter information in the default QoS rule, determines the first priority information in the target PCC rule as the second priority information in the default QoS rule, and determines the QFI of the default QoS flow as the QFI of the default QoS flow in the default QoS rule.

If the default QoS rule includes the third 5QI, the third ARP, the second packet filter information, the second priority information, the QFI of the default QoS flow, the SMF entity generates the default QoS rule corresponding to the PDU session in the above first, second, third, fourth and fifth ways.

Specifically, the SMF entity determines the first 5QI in the target PCC rule as the third 5QI in the default QoS rule, determines the first ARP in the target PCC rule as the third ARP in the default QoS rule, determines the first packet filter information in the target PCC rule as the second packet filter information in the default QoS rule, determines the first priority information in the target PCC rule as the second priority information in the default QoS rule, and determines the QFI of the default QoS flow as the QFI of the default QoS flow in the default QoS rule.

In an embodiment of the disclosure, after generating the default QoS rule corresponding to the PDU session, the SMF entity sends the default QoS rule to the UE through the AMF entity, so that the UE transmits the uplink data matching with the second packet filter information in the default QoS rule through the default QoS flow.

In one embodiment, after generating the default QoS rule corresponding to the PDU session, the SMF entity sends the second packet filter information and the QFI of the default QoS flow in the default QoS rule to the UPF entity, so that the UPF entity transmits the downlink data matching with the second packet filter information through the default QoS flow.

The process for a default QoS control is illustrated below by way of a specific embodiment; and the default QoS control is performed in the establishment process of the UE's PDU session as an example.

Figure 3:
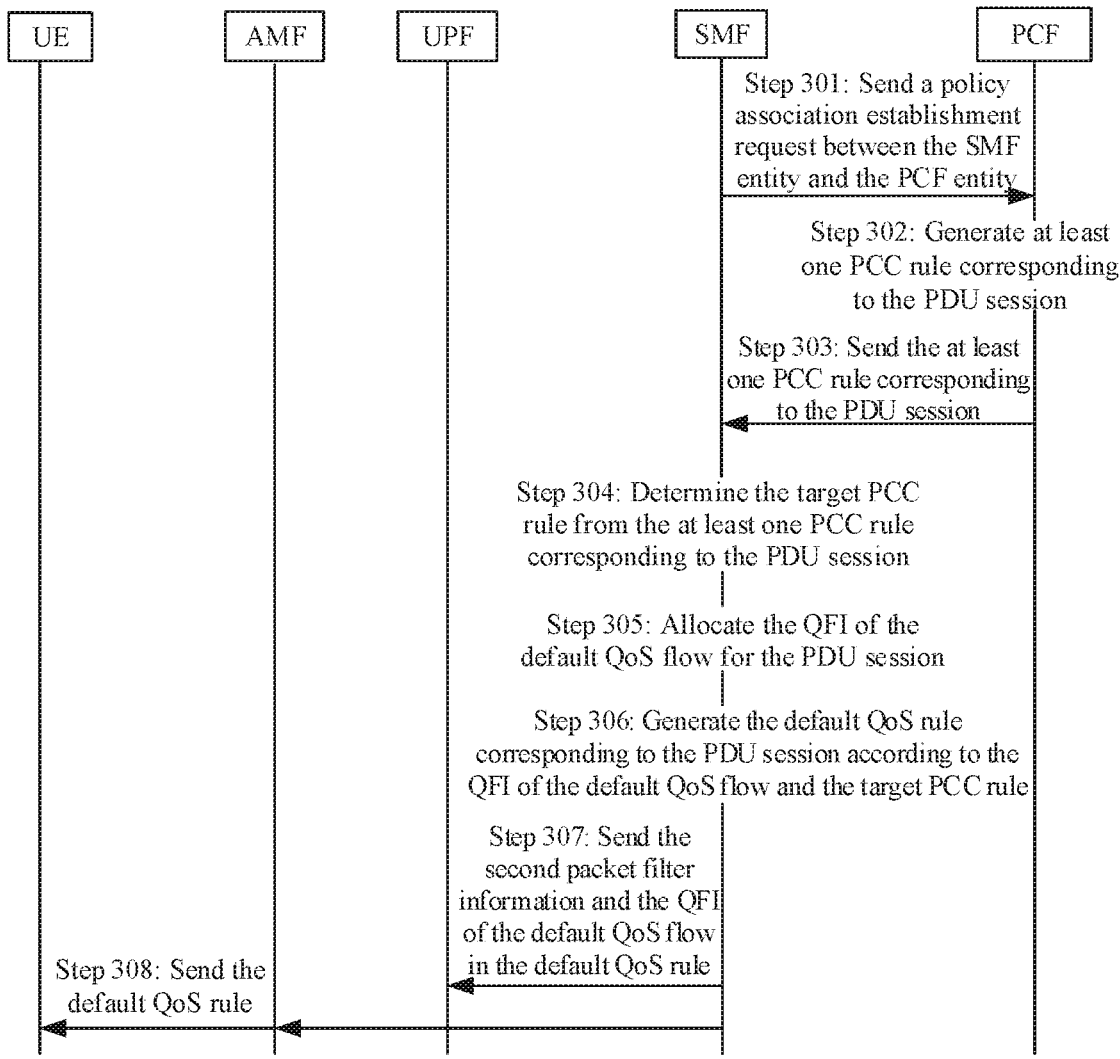
FIG. 3 is a schematic diagram of a first whole process for a default QoS control according to an embodiment of the disclosure.

As shown in FIG. 3, a schematic diagram of the first whole process for a default QoS control of an embodiment of the disclosure is shown.

Step 301: the SMF entity sends a policy association establishment request between the SMF entity and the PCF entity to the PCF entity.

Step 302: the PCF entity generates at least one PCC rule corresponding to the PDU session. The at least one PCC rule includes a target PCC rule.

Step 303: the PCF entity sends the at least one PCC rule corresponding to the PDU session to the SMF entity.

Step 304: the SMF entity determines the target PCC rule from the at least one PCC rule corresponding to the PDU session.

Step 305: the SMF entity allocates the QFI of the default QoS flow for the PDU session.

It should be noted that step 304 and step 305 do not distinguish the order, and it is possible to perform step 304 before step 305, or perform step 305 before step 304, or perform step 304 and step 305 simultaneously.

Step 306: the SMF entity generates the default QoS rule corresponding to the PDU session according to the QFI of the default QoS flow and the target PCC rule.

Step 307: the SMF entity sends the second packet filter information and the QFI of the default QoS flow in the default QoS rule to the UPF entity, so that the UPF entity transmits the downlink data matching with the second packet filter information through the default QoS flow.

Step 308: the SMF entity sends the default QoS rule to the UE through the AMF entity, so that the UE transmits the uplink data matching with the second packet filter information in the default QoS rule through the default QoS flow.

It should be noted that that step 307 and step 308 do not distinguish the order, and it is possible to perform step 307 before step 308, or perform step 308 before step 307, or perform step 307 and step 308 simultaneously.

Figure 4:
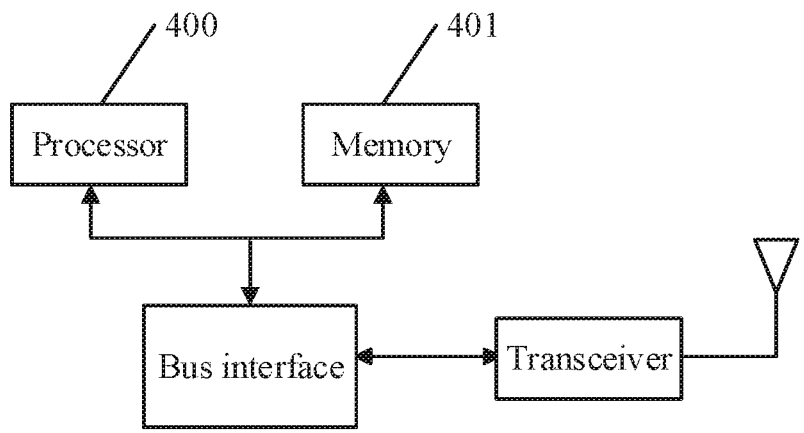
FIG. 4 is a schematic structural diagram of a first SMF entity according to an embodiment of the disclosure.

As shown in FIG. 4, a first SMF entity of an embodiment of the disclosure includes: a processor 400, a memory 401 and a bus interface.

The processor 400 is responsible for managing the bus architecture and general processing, and the memory 401 may store the data used by the processor 400 when performing the operations. The bus architecture may include any numbers of interconnected buses and bridges, which are specifically linked together by various circuits of one or more processors 400 and one or more memories 401. The bus architecture may further link various other circuits such as peripheral device, voltage regulator and power management circuit, which are all well known in the art and thus will not be further described again herein. The bus interface provides an interface. The processor 400 is responsible for managing the bus architecture and general processing, and the memory 401 may store the data used by the processor 400 when performing the operations.

The procedure disclosed by the embodiment of the disclosure may be applied in the processor 400 or implemented by the processor 400. In the implementation process, each step of the signal processing flow may be completed by the integrated logic circuit of hardware in the processor 400 or the instruction in the form of software. The processor 400 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 401, and the processor 400 reads the information in the memory 401 and completes the steps of the signal processing flow in combination with its hardware.

Specifically, the processor 400 is configured to read the program in the memory 401 and perform: determine a target PCC rule from at least one PCC rule sent by a PCF entity, and the PCC rule belongs to a PDU session established for a UE; generate a default QoS rule corresponding to the PDU session according to the target PCC rule, and send the default QoS rule to the UE.

In one embodiment, the PCC rule includes a part or all of: a first 5QI, a first ARP, first packet filter information, first priority information.

In one embodiment, the processor 400 is configured to: determine a PCC rule carrying the default indication information in the at least one PCC rule as the target PCC rule; or determine a PCC rule with the lowest priority in the at least one PCC rule as the target PCC rule.

In one embodiment, the processor 400 is further configured to:

receive a session level parameter sent by the PCF entity before determining the target PCC rule from the at least one PCC rule sent by the PCF entity;

the processor 400 is configured to:

determine the first type of information corresponding to the session level parameter in each PCC rule; and determine a PCC rule in which the first type of information is the same as the session level parameter as the target PCC rule.

In one embodiment, the session level parameter includes a second 5QI and/or a second ARP;

the processor 400 is configured to:

determine the first 5QI and/or the first ARP in each PCC rule as the first type of information.

In one embodiment, the processor 400 is further configured to:

determine the QFI of the default QoS flow allocated for the PDU session before generating the default QoS rule corresponding to the PDU session according to the target PCC rule;

the processor 400 is configured to:

generate the default QoS rule corresponding to the PDU session according to the QFI of the default QoS flow and the target PCC rule.

In one embodiment, the default QoS rule includes a part or all of: a third 5QI, a third ARP, second packet filter information, second priority information, QFI of default QoS flow.

In one embodiment, the processor 400 is configured to:

generate the default QoS rule corresponding to the PDU session in a part or all of the following ways:

in a first way: determining the first 5QI in the target PCC rule as the third 5QI in the default QoS rule;

in a second way: determining the first ARP in the target PCC rule as the third ARP in the default QoS rule;

in a third way: the SMF entity determines the first packet filter information in the target PCC rule as the second packet filter information in the default QoS rule;

in a fourth way: determining the first priority information in the target PCC rule as the second priority information in the default QoS rule;

in a fifth way: determining the QFI of the default QoS flow as the QFI of the default QoS flow in the default QoS rule.

In one embodiment, the processor 400 is further configured to: send the second packet filter information and the QFI of the default QoS flow to a UPF entity after generating the default QoS rule corresponding to the PDU session according to the target PCC rule, so that the UPF entity transmits the downlink data matching with the second packet filter information through the default QoS flow.

Figure 5:
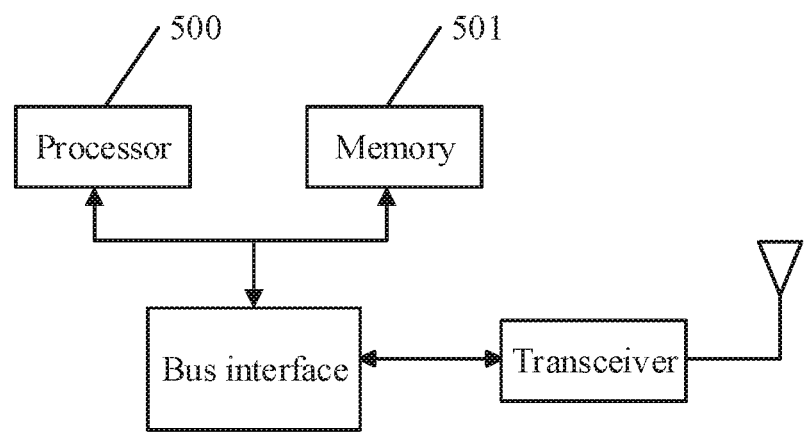
FIG. 5 is a schematic structural diagram of a first PCF entity according to an embodiment of the disclosure.

As shown in FIG. 5, a first PCF entity of an embodiment of the disclosure includes: a processor 500, a memory 501 and a bus interface.

The processor 500 is responsible for managing the bus architecture and general processing, and the memory 501 may store the data used by the processor 500 when performing the operations. The bus architecture may include any numbers of interconnected buses and bridges, which are specifically linked together by various circuits of one or more processors 500 and one or more memories 501. The bus architecture may further link various other circuits such as peripheral device, voltage regulator and power management circuit, which are all well known in the art and thus will not be further described again herein. The bus interface provides an interface. The processor 500 is responsible for managing the bus architecture and general processing, and the memory 501 may store the data used by the processor 500 when performing the operations.

The procedure disclosed by the embodiment of the disclosure may be applied in the processor 500 or implemented by the processor 500. In the implementation process, each step of the signal processing flow may be completed by the integrated logic circuit of hardware in the processor 500 or the instruction in the form of software. The processor 500 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 501, and the processor 500 reads the information in the memory 501 and completes the steps of the signal processing flow in combination with its hardware.

Specifically, the processor 500 is configured to read the program in the memory 501 and perform: determining at least one PCC rule corresponding to a PDU session established for a UE; and send the at least one PCC rule to an SMF entity, so that the SMF entity determines a target PCC rule from the at least one PCC rule and generates a default QoS rule corresponding to the PDU session according to the target PCC rule.

In one embodiment, the PCC rule includes a part or all of: a first 5QI, a first ARP, first packet filter information, first priority information.

In one embodiment, the processor 500 is configured to: add the default indication information to one of the at least one PCC rule, and send the PCC rule including the default indication information and other PCC rules not including the default indication information to the SMF entity, so that the SMF entity determines the target PCC rule according to the default indication information; or send at least one PCC rule including the first priority information to the SMF entity, so that the SMF entity determines the target PCC rule according to the first priority information.

In one embodiment, the processor 500 is further configured to:

determine a session level parameter corresponding to the PDU session before sending the at least one PCC rule to the SMF entity;

the processor 500 is configured to:

send the at least one PCC rule and the session level parameter to the SMF entity, so that the SMF entity determines the target PCC rule according to the session level parameter.

In one embodiment, the session level parameter includes a second 5QI and/or a second ARP.

In one embodiment, the processor 500 is configured to: determine the first packet filter information in the PCC rule according to a part or all of: an identifier of the UE, DNN information accessed by the PDU session, subscription-related information of the UE, data model prediction information of the UE.

Figure 6:
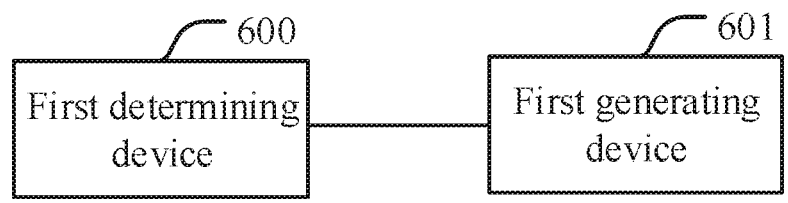
FIG. 6 is a schematic structural diagram of a second SMF entity according to an embodiment of the disclosure.

As shown in FIG. 6, a second SMF entity of an embodiment of the disclosure includes:

a first determining device 600 configured to determine a target PCC rule from at least one PCC rule sent by a PCF entity; and the PCC rule belongs to a PDU session established for a UE;

a first generating device 601 configured to generate a default QoS rule corresponding to the PDU session according to the target PCC rule, and send the default QoS rule to the UE.

In one embodiment, the PCC rule includes a part or all of: a first 5QI, a first ARP, first packet filter information, first priority information.

In one embodiment, the first determining device 600 is configured to:

determine a PCC rule carrying the default indication information in the at least one PCC rule as the target PCC rule; or determine a PCC rule with the lowest priority in the at least one PCC rule as the target PCC rule.

In one embodiment, the first determining device 600 is further configured to:

receive a session level parameter sent by the PCF entity before determining the target PCC rule from the at least one PCC rule sent by the PCF entity;

the first determining device 600 is configured to:

determine the first type of information corresponding to the session level parameter in each PCC rule; and determine a PCC rule in which the first type of information is the same as the session level parameter as the target PCC rule.

In one embodiment, the session level parameter includes a second 5QI and/or a second ARP; the first determining device 600 is configured to: determine the first 5QI and/or the first ARP in each PCC rule as the first type of information.

In one embodiment, the first generating device 601 is further configured to: determine the QFI of the default QoS flow allocated for the PDU session before generating the default QoS rule corresponding to the PDU session according to the target PCC rule; the first generating device 601 is configured to: generate the default QoS rule corresponding to the PDU session according to the QFI of the default QoS flow and the target PCC rule.

In one embodiment, the default QoS rule includes a part or all of: a third 5QI, a third ARP, second packet filter information, second priority information, QFI of default QoS flow.

In one embodiment, the first generating device 601 is configured to:

generate the default QoS rule corresponding to the PDU session in a part or all of the following ways:

in a first way: determining the first 5QI in the target PCC rule as the third 5QI in the default QoS rule;

in a second way: determining the first ARP in the target PCC rule as the third ARP in the default QoS rule;

in a third way: the SMF entity determines the first packet filter information in the target PCC rule as the second packet filter information in the default QoS rule;

in a fourth way: determining the first priority information in the target PCC rule as the second priority information in the default QoS rule;

in a fifth way: determining the QFI of the default QoS flow as the QFI of the default QoS flow in the default QoS rule.

In one embodiment, the first generating device 601 is further configured to:

send the second packet filter information and the QFI of the default QoS flow to a UPF entity after generating the default QoS rule corresponding to the PDU session according to the target PCC rule, so that the UPF entity transmits the downlink data matching with the second packet filter information through the default QoS flow.

Figure 7:
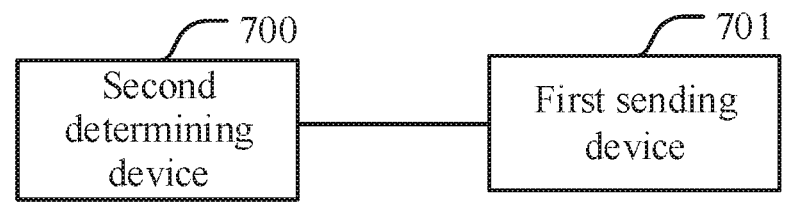
FIG. 7 is a schematic structural diagram of a second PCF entity according to an embodiment of the disclosure.

As shown in FIG. 7, a second PCF entity of an embodiment of the disclosure includes:

a second determining device 700 configured to determine at least one PCC rule corresponding to a PDU session established for a UE;

a first sending device 701 configured to send the at least one PCC rule to an SMF entity, so that the SMF entity determines a target PCC rule from the at least one PCC rule and generates a default QoS rule corresponding to the PDU session according to the target PCC rule.

In one embodiment, the PCC rule includes a part or all of: a first 5QI, a first ARP, first packet filter information, first priority information.

In one embodiment, the first sending device 701 is configured to:

add the default indication information to one of the at least one PCC rule, and send the PCC rule including the default indication information and other PCC rules not including the default indication information to the SMF entity, so that the SMF entity determines the target PCC rule according to the default indication information; or send at least one PCC rule including the first priority information to the SMF entity, so that the SMF entity determines the target PCC rule according to the first priority information.

In one embodiment, the first sending device 701 is further configured to:

determine a session level parameter corresponding to the PDU session before sending the at least one PCC rule to the SMF entity;

the first sending device 701 is configured to:

send the at least one PCC rule and the session level parameter to the SMF entity, so that the SMF entity determines the target PCC rule according to the session level parameter.

In one embodiment, the session level parameter includes a second 5QI and/or a second ARP.

In one embodiment, the second determining device 700 is configured to:

determine the first packet filter information in the PCC rule according to a part or all of:

an identifier of the UE, DNN information accessed by the PDU session, subscription-related information of the UE, data model prediction information of the UE.

An embodiment of the disclosure provides a computer readable storage medium storing a computer program thereon, where the program, when executed by a processor, implements the steps performed by the SMF entity in the embodiments of the disclosure.

An embodiment of the disclosure provides a computer readable storage medium storing a computer program thereon, where the program, when executed by a processor, implements the steps performed by the PCF entity in the embodiments of the disclosure.

Based upon the same inventive concept, an embodiment of the disclosure further provides a method for a default QoS control. Since the device corresponding to this method is the SMF entity in the default QoS control system of the embodiments of the disclosure and the principle solving the problem of this method is similar to that of the device, the implementations of this method may refer to the implementations of the device, and the repeated description thereof will be omitted here.

Figure 8:
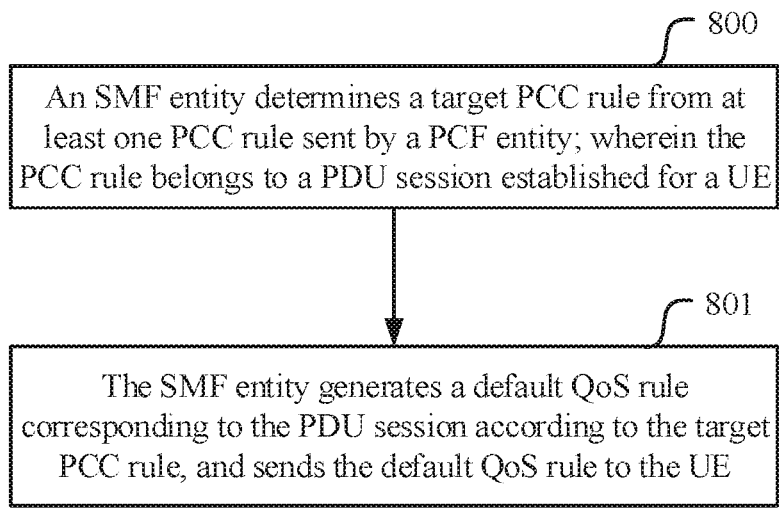
FIG. 8 is a schematic flow diagram of a first method for a default QoS control according to an embodiment of the disclosure.

As shown in FIG. 8, a first method for a default QoS control according to an embodiment of the disclosure includes the following steps.

Step 800: an SMF entity determines a target PCC rule from at least one PCC rule sent by a PCF entity; and the PCC rule belongs to a PDU session established for a UE.

Step 801: the SMF entity generates a default QoS rule corresponding to the PDU session according to the target PCC rule, and sends the default QoS rule to the UE.

In one embodiment, the PCC rule includes a part or all of: a first 5QI, a first ARP, first packet filter information, first priority information.

In one embodiment, the SMF entity determines the target PCC rule from at least one PCC rule sent by the PCF entity, including:

the SMF entity determines a PCC rule carrying the default indication information in the at least one PCC rule as the target PCC rule; or the SMF entity determines a PCC rule with the lowest priority in the at least one PCC rule as the target PCC rule.

In one embodiment, before the SMF entity determines the target PCC rule from at least one PCC rule sent by the PCF entity, the method further includes:

the SMF entity receives a session level parameter sent by the PCF entity;

the SMF entity determines the target PCC rule from at least one PCC rule sent by the PCF entity, including:

the SMF entity determines the first type of information corresponding to the session level parameter in each PCC rule; and determines a PCC rule in which the first type of information is the same as the session level parameter as the target PCC rule.

In one embodiment, the session level parameter includes a second 5QI and/or a second ARP;

the SMF entity determines the first type of information corresponding to the session level parameter in each PCC rule, including:

the SMF entity determines the first 5QI and/or the first ARP in each PCC rule as the first type of information.

In one embodiment, before the SMF entity generates the default QoS rule corresponding to the PDU session according to the target PCC rule, the method further includes:

the SMF entity determines the QFI of the default QoS flow allocated for the PDU session;

the SMF entity generates the default QoS rule corresponding to the PDU session according to the target PCC rule, including:

the SMF entity generates the default QoS rule corresponding to the PDU session according to the QFI of the default QoS flow and the target PCC rule.

In one embodiment, the default QoS rule includes a part or all of:

a third 5QI, a third ARP, second packet filter information, second priority information, QFI of default QoS flow.

In one embodiment, the SMF entity generates the default QoS rule corresponding to the PDU session in a part or all of the following ways:

in a first way: the SMF entity determines the first 5QI in the target PCC rule as the third 5QI in the default QoS rule;

in a second way: the SMF entity determines the first ARP in the target PCC rule as the third ARP in the default QoS rule;

in a third way: the SMF entity determines the first packet filter information in the target PCC rule as the second packet filter information in the default QoS rule;

in a fourth way: the SMF entity determines the first priority information in the target PCC rule as the second priority information in the default QoS rule;

in a fifth way: the SMF entity determines the QFI of the default QoS flow as the QFI of the default QoS flow in the default QoS rule.

In one embodiment, after the SMF entity generates the default QoS rule corresponding to the PDU session according to the target PCC rule, the method further includes:

the SMF entity sends the second packet filter information and the QFI of the default QoS flow to a UPF entity, so that the UPF entity transmits the downlink data matching with the second packet filter information through the default QoS flow.

Based upon the same inventive concept, an embodiment of the disclosure further provides a method for a default QoS control. Since the device corresponding to this method is the PCF entity in the default QoS control system of the embodiments of the disclosure and the principle solving the problem of this method is similar to that of the device, the implementations of this method may refer to the implementations of the device, and the repeated description thereof will be omitted here.

Figure 9:
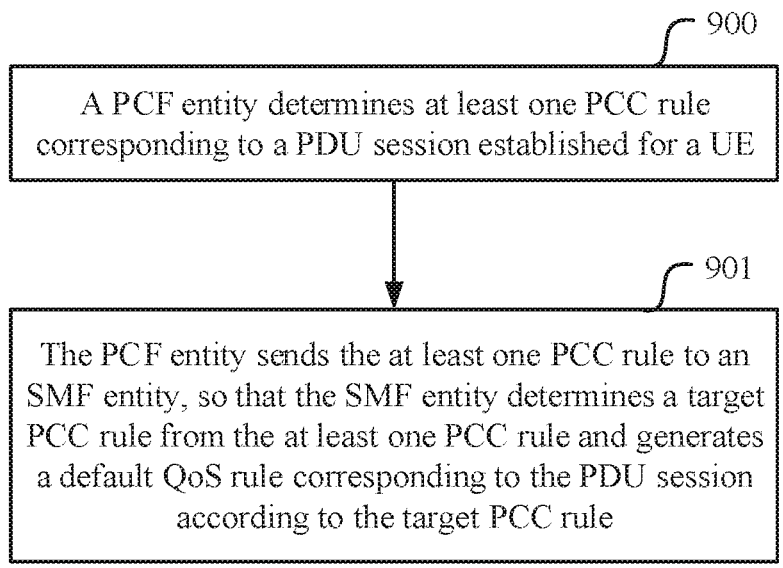
FIG. 9 is a schematic flow diagram of a second method for a default QoS control according to an embodiment of the disclosure.

As shown in FIG. 9, a second method for a default QoS control according to an embodiment of the disclosure includes the following steps:

Step 900: a PCF entity determines at least one PCC rule corresponding to a PDU session established for a UE.

Step 901: the PCF entity sends the at least one PCC rule to an SMF entity, so that the SMF entity determines a target PCC rule from the at least one PCC rule and generates a default QoS rule corresponding to the PDU session according to the target PCC rule.

In one embodiment, the PCC rule includes a part or all of: a first 5QI, a first ARP, first packet filter information, first priority information.

In one embodiment, the PCF entity sends the at least one PCC rule to the SMF entity including:

the PCF entity adds the default indication information to one of the at least one PCC rule, and sends the PCC rule including the default indication information and other PCC rules not including the default indication information to the SMF entity, so that the SMF entity determines the target PCC rule according to the default indication information; or the PCF entity sends at least one PCC rule including the first priority information to the SMF entity, so that the SMF entity determines the target PCC rule according to the first priority information.

In one embodiment, before the PCF entity sends the at least one PCC rule to the SMF entity, the method further includes:

the PCF entity determines a session level parameter corresponding to the PDU session;

the PCF entity sends the at least one PCC rule to the SMF entity including:

the PCF entity sends the at least one PCC rule and the session level parameter to the SMF entity, so that the SMF entity determines the target PCC rule according to the session level parameter.

In one embodiment, the session level parameter includes a second 5QI and/or a second ARP.

In one embodiment, the PCF entity determines the first packet filter information in the PCC rule according to a part or all of:

an identifier of the UE, DNN information accessed by the PDU session, subscription-related information of the UE, data model prediction information of the UE.

In the embodiment of the disclosure, the SMF entity receives the session level parameter including the third packet filter information sent by the PCF entity; and the SMF entity generates the default QoS rule corresponding to the PDU session according to the session level parameter, and sends the default QoS rule to the UE.

The session level parameter belongs to a PDU session established for the UE.

In the embodiments of the disclosure, the SMF entity receives the session level parameter including the third packet filter information sent by the PCF entity and generates the default QoS rule corresponding to the PDU session according to the session level parameter including the third packet filter information, and the UE can transmit the uplink data through the default QoS flow according to the default QoS rule, to ensure the connectivity and the quality of service control of the PDU session; and the session level parameter used by the SMF to generate the default QoS rule is determined by the PCF entity for a PDU session of the UE, to implement the precise control of the specific UE and specific PDU session, and further improve the system performance.

In the following description process, the illustration is performed from the cooperative implementations of the SMF entity side and the PCF entity side, but this does not mean that they must cooperate with each other to implement. In fact, when the SMF entity side and the PCF entity side implement separately, the problems that exist respectively on the SMF entity side and the PCF entity side are also be solved, but the better technical effect may be obtained when they are used in combination.

Figure 10:
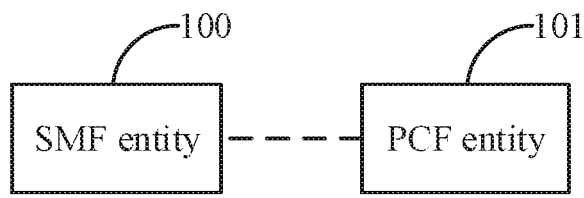
FIG. 10 is a schematic structural diagram of a second system for a default QoS control according to an embodiment of the disclosure.

As shown in FIG. 10, a second default QoS control system of an embodiment of the disclosure includes the followings.

An SMF entity 100 is configured to receive the session level parameter including the third packet filter information sent by the PCF entity, generate the default QoS rule corresponding to the PDU session according to the session level parameter, and send the default QoS rule to the UE.

A PCF entity 101 is configured to determine the session level parameter including the third packet filter information and corresponding to a PDU session established for a UE; and send the session level parameter to the SMF entity, so that the SMF entity generates the default QoS rule corresponding to the PDU session according to the session level parameter.

It should be noted that the process for a default QoS control in this embodiment of the disclosure is performed independently for each PDU session of the UE, and the process for a default QoS control occurs in the process of establishing the UE's PDU session, or the PCF entity determines to modify the default QoS rule of the PDU session after the establishment of the PDU session is completed.

When the process for a default QoS control occurs in the process of establishing the UE's PDU session, and after the PCF entity receives the policy association establishment request between the SMF entity and the PCF entity, the PCF entity generates the session level parameter corresponding to the PDU session, and sends the generated session level parameter to the SMF entity.

After the establishment of the PDU session is completed, and when the PCF entity determines that some or all of the parameters in the default QoS rule need to be modified, the PCF entity generates the session level parameter corresponding to the PDU session, and sends the generated session level parameter to the SMF entity.

In an embodiment of the disclosure, the session level parameter corresponding to the PDU session generated by the PCF entity includes the third packet filter information.

In one embodiment, the session level parameter further includes a part or all of: a fourth 5QI, a fourth ARP, third priority information.

When the PCF entity determines the fourth 5QI and the fourth ARP in the session level parameter, the fourth 5QI and the fourth ARP may be determined by the methods in the prior art, which will not be described in detail here.

The third priority information in the session level parameter is configured by the PCF entity.

When determining the third packet filter information in the session level parameter, the PCF entity determines it according to some or all of:

an identifier of the UE, DNN information accessed by the PDU session, subscription-related information of the UE, data model prediction information of the UE.

The identifier of the UE is sent from the SMF entity to the PCF entity; the subscription-related information of the UE is obtained by the PCF entity from the operator's database; and the data model prediction information of the UE is obtained by the PCF entity from the operator's data analysis network element, for example, the data model prediction information of the UE is the UE mobile prediction model, UE application usage model, etc.

In an embodiment of the disclosure, after the SMF entity receives the session level parameter sent by the PCF entity, and before the SMF entity generates the default QoS rule corresponding to the PDU session, the SMF entity determines the QFI of the default QoS flow allocated for the PDU session.

Specifically, if the SMF entity generates the default QoS rule corresponding to the PDU session in the process of establishing the PDU session for the UE, the SMF entity allocates the QFI of the default QoS flow for the PDU session.

If the SMF entity modifies the default QoS rules corresponding to the PDU session after the establishment of the UE's PDU session is completed, the SMF entity determines the QFI of the default QoS flow allocated for the PDU session in the PDU session establishment process.

In one embodiment, the SMF entity generates the default QoS rule corresponding to the PDU session according to the QFI of the default QoS flow and the session level parameter.

The default QoS rule includes a part or all of: a fifth 5QI, a fifth ARP, fourth packet filter information, fourth priority information, QFI of default QoS flow.

In an implementation, the SMF entity generates the default QoS rule corresponding to the PDU session in a part or all of the following ways:

in a first way: the SMF entity determines the fourth 5QI in the session level parameter as the fifth 5QI in the default QoS rule;

in a second way: the SMF entity determines the fourth ARP in the session level parameter as the fifth ARP in the default QoS rule;

in a third way: the SMF entity determines the third packet filter information in the session level parameter as the fourth packet filter information in the default QoS rule;

in a fourth way: the SMF entity determines the third priority information in the session level parameter as the fourth priority information in the default QoS rule;

in a fifth way: the SMF entity determines the QFI of the default QoS flow as the QFI of the default QoS flow in the default QoS rule.

If the default QoS rule includes the fourth packet filter information, the fourth priority information, and the QFI of the default QoS flow, the SMF entity generates the default QoS rule corresponding to the PDU session in the above third, fourth and fifth ways.

Specifically, the SMF entity determines the third packet filter information in the session level parameter as the fourth packet filter information in the default QoS rule, determines the third priority information in the session level parameter as the fourth priority information in the default QoS rule, and determines the QFI of the default QoS flow as the QFI of the default QoS flow in the default QoS rule.

If the default QoS rule includes the fifth 5QI, the fifth ARP, the fourth packet filter information, the fourth priority information, and the QFI of the default QoS flow, the SMF entity generates the default QoS rule corresponding to the PDU session in the above first, second, third, fourth and fifth ways.

Specifically, the SMF entity determines the fourth 5QI in the session level parameter as the fifth 5QI in the default QoS rule, determines the fourth ARP in the session level parameter as the fifth ARP in the default QoS rule, determines the third packet filter information in the session level parameter as the fourth packet filter information in the default QoS rule, determines the third priority information in the session level parameter as the fourth priority information in the default QoS rule, and determines the QFI of the default QoS flow as the QFI of the default QoS flow in the default QoS rule.

In an embodiment of the disclosure, after generating the default QoS rule corresponding to the PDU session, the SMF entity sends the default QoS rule to the UE through the AMF entity, so that the UE transmits the uplink data matching with the fourth packet filter information in the default QoS rule through the default QoS flow.

In one embodiment, after generating the default QoS rule corresponding to the PDU session, the SMF entity sends the fourth packet filter information and the QFI of the default QoS flow in the default QoS rule to the UPF entity, so that the UPF entity transmits the downlink data matching with the fourth packet filter information through the default QoS flow.

The process for a default QoS control is illustrated below by way of a specific embodiment; and the default QoS control is performed in the establishment process of the UE's PDU session as an example.

Figure 11:
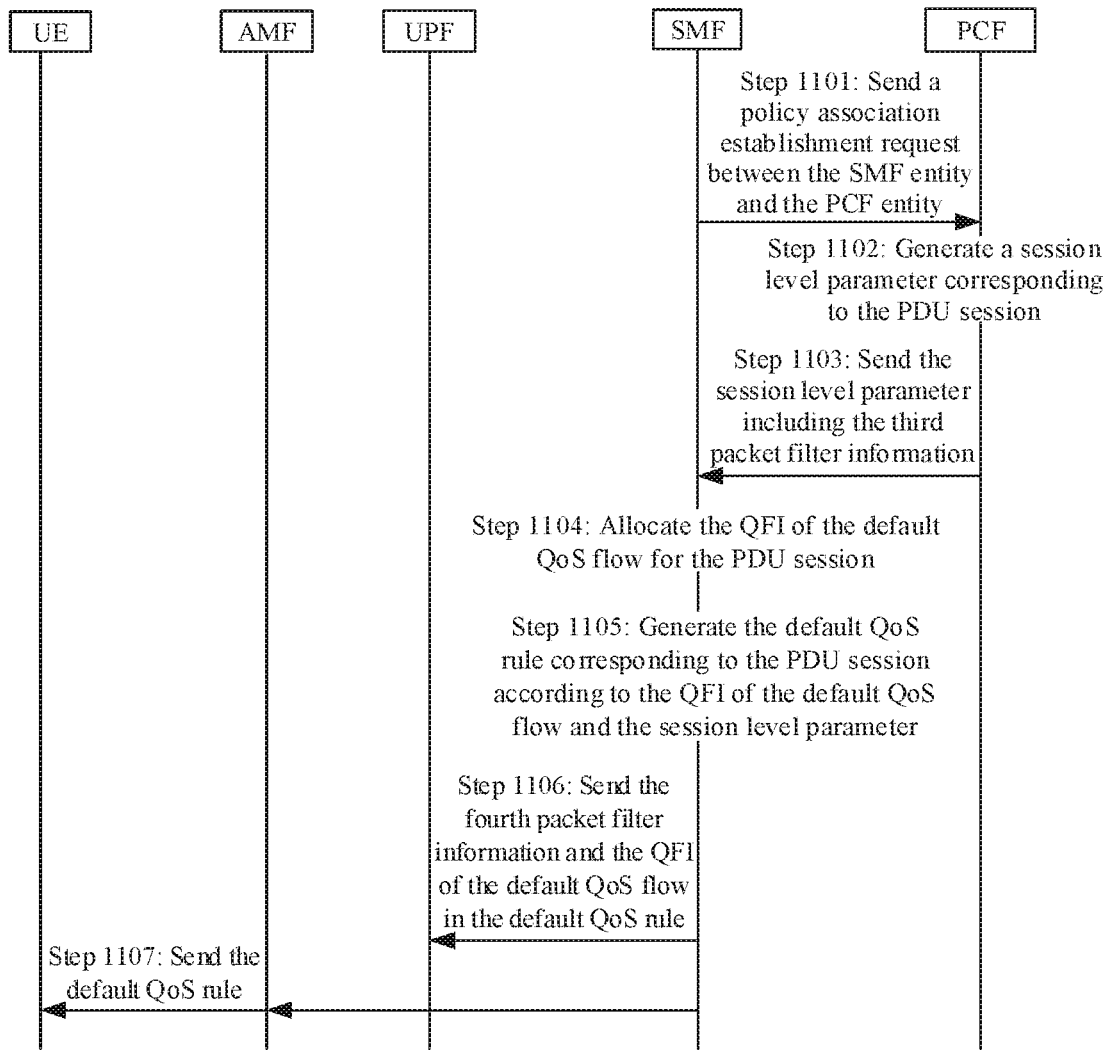
FIG. 11 is a schematic diagram of a second whole process for a default QoS control according to an embodiment of the disclosure.

As shown in FIG. 11, a schematic diagram of a second whole process for a default QoS control according to an embodiment of the disclosure is shown.

Step 1101: the SMF entity sends a policy association establishment request between the SMF entity and the PCF entity to the PCF entity.

Step 1102: the PCF entity generates the session level parameter corresponding to the PDU session. The session level parameter includes at least the third packet filter information.

Step 1103: the PCF entity sends the session level parameter including the third packet filter information to the SMF entity.

Step 1104: the SMF entity allocates the QFI of the default QoS flow for the PDU session.

Step 1105: the SMF entity generates the default QoS rule corresponding to the PDU session according to the QFI of the default QoS flow and the session level parameter.

Step 1106: the SMF entity sends the fourth packet filter information and the QFI of the default QoS flow in the default QoS rule to the UPF entity, so that the UPF entity transmits the downlink data matching with the fourth packet filter information through the default QoS flow.

Step 1107: the SMF entity sends the default QoS rule to the UE through the AMF entity, so that the UE transmits the uplink data matching with the fourth packet filter information in the default QoS rule through the default QoS flow.

It should be noted that step 1106 and step 1107 do not distinguish the order, and it is possible to perform step 1106 before step 1107, or perform step 1107 before step 1106, or perform step 1106 and step 1107 simultaneously.

Figure 12:
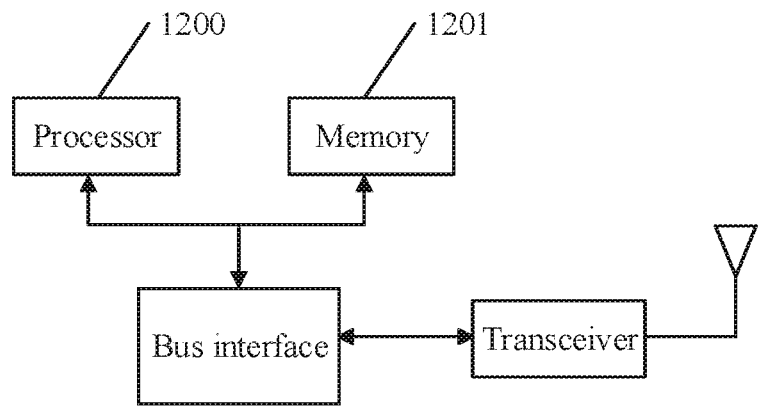
FIG. 12 is a schematic structural diagram of a third SMF entity according to an embodiment of the disclosure.

As shown in FIG. 12, a third SMF entity of an embodiment of the disclosure includes: a processor 1200, a memory 1201 and a bus interface.

The processor 1200 is responsible for managing the bus architecture and general processing, and the memory 1201 may store the data used by the processor 1200 when performing the operations. The bus architecture may include any numbers of interconnected buses and bridges, which are specifically linked together by various circuits of one or more processors 1200 and one or more memories 1201. The bus architecture may further link various other circuits such as peripheral device, voltage regulator and power management circuit, which are all well known in the art and thus will not be further described again herein. The bus interface provides an interface. The processor 1200 is responsible for managing the bus architecture and general processing, and the memory 1201 may store the data used by the processor 1200 when performing the operations.

The procedure disclosed by the embodiment of the disclosure may be applied in the processor 1200 or implemented by the processor 1200. In the implementation process, each step of the signal processing flow may be completed by the integrated logic circuit of hardware in the processor 1200 or the instruction in the form of software. The processor 1200 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1201, and the processor 1200 reads the information in the memory 1201 and completes the steps of the signal processing flow in combination with its hardware.

Specifically, the processor 1200 is configured to read the program in the memory 1201 and perform:

receiving the session level parameter including the third packet filter information sent by a PCF entity, and the session level parameter belongs to a PDU session established for a UE; generate a default QoS rule corresponding to the PDU session according to the session level parameter, and send the default QoS rule to the UE.

In one embodiment, the session level parameter further includes a part or all of: a fourth 5QI, a fourth ARP, third priority information.

In one embodiment, the processor 1200 is further configured to: determine the QFI of the default QoS flow allocated for the PDU session before generating the default QoS rule corresponding to the PDU session according to the session level parameter; the processor 1200 is configured to: generate the default QoS rule corresponding to the PDU session according to the QFI of the default QoS flow and the session level parameter.

In one embodiment, the default QoS rule includes a part or all of: a fifth 5QI, a fifth ARP, fourth packet filter information, fourth priority information, QFI of default QoS flow.

In one embodiment, the processor 1200 is configured to: generate the default QoS rule corresponding to the PDU session in some or all of the following ways:

in a first way: determining the fourth 5QI in the session level parameter as the fifth 5QI in the default QoS rule;

in a second way: determining the fourth ARP in the session level parameter as the fifth ARP in the default QoS rule;

in a third way: determining the third packet filter information in the session level parameter as the fourth packet filter information in the default QoS rule;

in a fourth way: determining the third priority information in the session level parameter as the fourth priority information in the default QoS rule;

in a fifth way: determining the QFI of the default QoS flow as the QFI of the default QoS flow in the default QoS rule.

In one embodiment, the processor 1200 is further configured to:

send the fourth packet filter information and the QFI of the default QoS flow to a UPF entity after generating the default QoS rule corresponding to the PDU session according to the session level parameter, so that the UPF entity transmits the downlink data matching with the fourth packet filter information through the default QoS flow.

Figure 13:
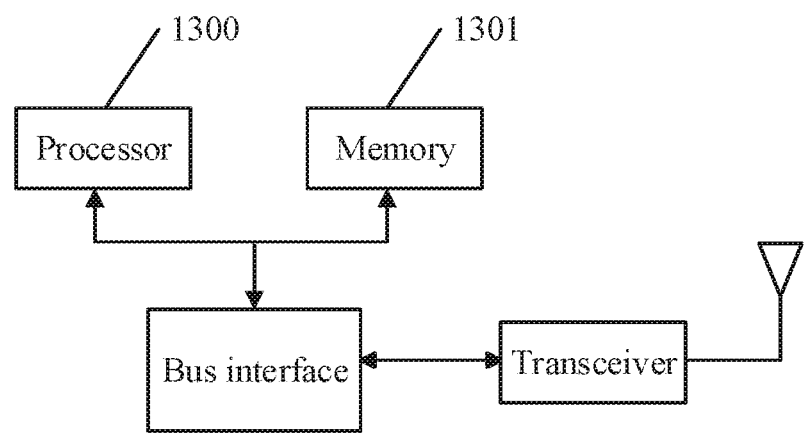
FIG. 13 is a schematic structural diagram of a third PCF entity according to an embodiment of the disclosure.

As shown in FIG. 13, a third PCF entity of an embodiment of the disclosure includes: a processor 1300, a memory 1301 and a bus interface.

The processor 1300 is responsible for managing the bus architecture and general processing, and the memory 1301 may store the data used by the processor 1300 when performing the operations. The bus architecture may include any numbers of interconnected buses and bridges, which are specifically linked together by various circuits of one or more processors 1300 and one or more memories 1301. The bus architecture may further link various other circuits such as peripheral device, voltage regulator and power management circuit, which are all well known in the art and thus will not be further described again herein. The bus interface provides an interface. The processor 1300 is responsible for managing the bus architecture and general processing, and the memory 1301 may store the data used by the processor 1300 when performing the operations.

The procedure disclosed by the embodiment of the disclosure may be applied in the processor 1300 or implemented by the processor 1300. In the implementation process, each step of the signal processing flow may be completed by the integrated logic circuit of hardware in the processor 1300 or the instruction in the form of software. The processor 1300 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1301, and the processor 1300 reads the information in the memory 1301 and completes the steps of the signal processing flow in combination with its hardware.

Specifically, the processor 1300 is configured to read the program in the memory 1301 and perform:

determining the session level parameter including the third packet filter information and corresponding to a PDU session established for a UE; and send the session level parameter to an SMF entity, so that the SMF entity generates a default QoS rule corresponding to the PDU session according to the session level parameter.

In one embodiment, the session level parameter further includes a part or all of:

a fourth 5QI, a fourth ARP, third priority information.

In one embodiment, the processor 1300 is configured to:

determine the third packet filter information in the session level parameter according to a part or all of:

an identifier of the UE, DNN information accessed by the PDU session, subscription-related information of the UE, and data model prediction information of the UE.

Figure 14:
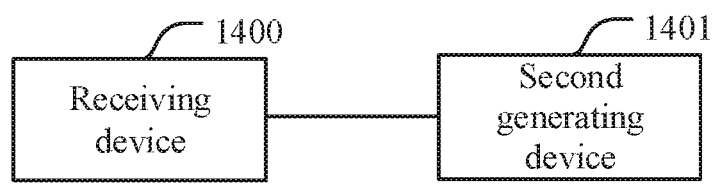
FIG. 14 is a schematic structural diagram of a fourth SMF entity according to an embodiment of the disclosure.

As shown in FIG. 14, a fourth SMF entity of an embodiment of the disclosure includes:

a receiving device 1400 configured to receive the session level parameter including the third packet filter information sent by a PCF entity; and the session level parameter belongs to a PDU session established for a UE;

a second generating device 1401 configured to generate a default QoS rule corresponding to the PDU session according to the session level parameter, and send the default QoS rule to the UE.

In one embodiment, the session level parameter further includes a part or all of: a fourth 5QI, a fourth ARP, third priority information.

In one embodiment, the second generating device 1401 is further configured to:

determine the QFI of the default QoS flow allocated for the PDU session before generating the default QoS rule corresponding to the PDU session according to the session level parameter;

the second generating device 1401 is configured to:

generate the default QoS rule corresponding to the PDU session according to the QFI of the default QoS flow and the session level parameter.

In one embodiment, the default QoS rule includes a part or all of: a fifth 5QI, a fifth ARP, fourth packet filter information, fourth priority information, QFI of default QoS flow.

In one embodiment, the second generating device 1401 is configured to:

generate the default QoS rule corresponding to the PDU session in a part or all of the following ways:

in a first way: determining the fourth 5QI in the session level parameter as the fifth 5QI in the default QoS rule;

in a second way: determining the fourth ARP in the session level parameter as the fifth ARP in the default QoS rule;

in a third way: determining the third packet filter information in the session level parameter as the fourth packet filter information in the default QoS rule;

in a fourth way: determining the third priority information in the session level parameter as the fourth priority information in the default QoS rule;

in a fifth way: determining the QFI of the default QoS flow as the QFI of the default QoS flow in the default QoS rule.

In one embodiment, the second generating device 1401 is further configured to:

send the fourth packet filter information and the QFI of the default QoS flow to a UPF entity after generating the default QoS rule corresponding to the PDU session according to the session level parameter, so that the UPF entity transmits the downlink data matching with the fourth packet filter information through the default QoS flow.

Figure 15:
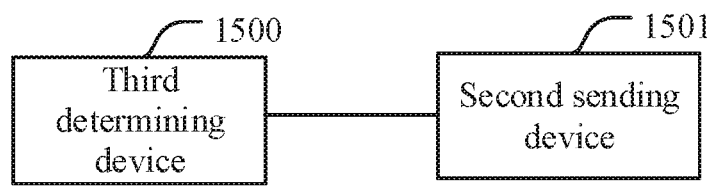
FIG. 15 is a schematic structural diagram of a fourth PCF entity according to an embodiment of the disclosure.

As shown in FIG. 15, a fourth PCF entity of an embodiment of the disclosure includes:

a third determining device 1500 configured to determine the session level parameter including the third packet filter information and corresponding to a PDU session established for a UE;

a second sending device 1501 configured to send the session level parameter to an SMF entity, so that the SMF entity generates a default QoS rule corresponding to the PDU session according to the session level parameter.

In one embodiment, the session level parameter further includes a part or all of: a fourth 5QI, a fourth ARP, third priority information.

In one embodiment, the third determining device 1500 is configured to:

determine the third packet filter information in the session level parameter according to a part or all of:

an identifier of the UE, DNN information accessed by the PDU session, subscription-related information of the UE, data model prediction information of the UE.

An embodiment of the disclosure provides a computer readable storage medium storing a computer program thereon, where the program, when executed by a processor, implements the steps performed by the SMF entity in the embodiments of the disclosure.

An embodiment of the disclosure provides a computer readable storage medium storing a computer program thereon, where the program, when executed by a processor, implements the steps performed by the PCF entity in the embodiments of the disclosure.

Based upon the same inventive concept, an embodiment of the disclosure further provides a default QoS control method. Since the device corresponding to this method is the SMF entity in the default QoS control system of the embodiments of the disclosure and the principle solving the problem of this method is similar to that of the device, the implementations of this method may refer to the implementations of the device, and the repeated description thereof will be omitted here.

Figure 16:
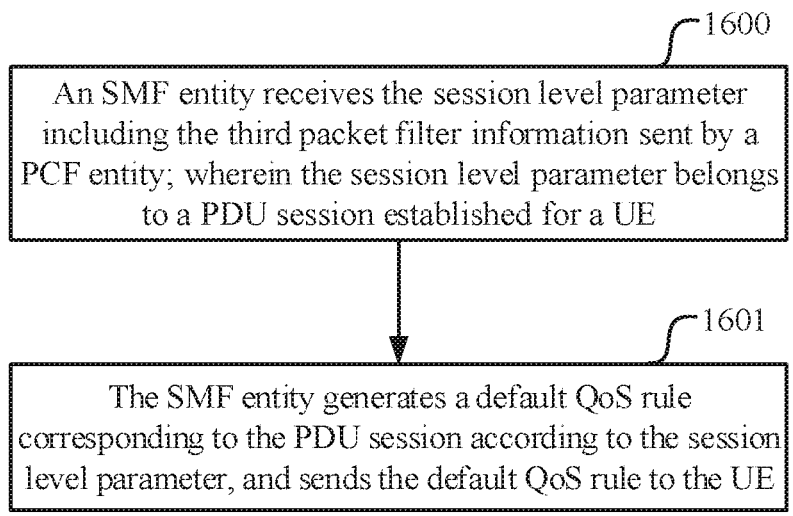
FIG. 16 is a schematic flow diagram of a third method for a default QoS control according to an embodiment of the disclosure.

As shown in FIG. 16, a third method for a default QoS control according to an embodiment of the disclosure includes the followings.

Step 1600: an SMF entity receives the session level parameter including the third packet filter information sent by a PCF entity; and the session level parameter belongs to a PDU session established for a UE.

Step 1601: the SMF entity generates a default QoS rule corresponding to the PDU session according to the session level parameter, and sends the default QoS rule to the UE.

In one embodiment, the session level parameter further includes a part or all of: a fourth 5QI, a fourth ARP, third priority information.

In one embodiment, before the SMF entity generates the default QoS rule corresponding to the PDU session according to the session level parameter, the method further includes:

the SMF entity determines the QFI of the default QoS flow allocated for the PDU session;

the SMF entity generates the default QoS rule corresponding to the PDU session according to the session level parameter including:

the SMF entity generates the default QoS rule corresponding to the PDU session according to the QFI of the default QoS flow and the session level parameter.

In one embodiment, the default QoS rule includes a part or all of:

a fifth 5QI, a fifth ARP, fourth packet filter information, fourth priority information, QFI of default QoS flow.

In one embodiment, the SMF entity generates the default QoS rule corresponding to the PDU session in a part or all of the following ways:

in a first way: the SMF entity determines the fourth 5QI in the session level parameter as the fifth 5QI in the default QoS rule;

in a second way: the SMF entity determines the fourth ARP in the session level parameter as the fifth ARP in the default QoS rule;

in a third way: the SMF entity determines the third packet filter information in the session level parameter as the fourth packet filter information in the default QoS rule;

in a fourth way: the SMF entity determines the third priority information in the session level parameter as the fourth priority information in the default QoS rule;

in a fifth way: the SMF entity determines the QFI of the default QoS flow as the QFI of the default QoS flow in the default QoS rule.

In one embodiment, after the SMF entity generates the default QoS rule corresponding to the PDU session according to the session level parameter, the method further includes:

the SMF entity sends the fourth packet filter information and the QFI of the default QoS flow to a UPF entity, so that the UPF entity transmits the downlink data matching with the fourth packet filter information through the default QoS flow.

Based upon the same inventive concept, an embodiment of the disclosure further provides a method for a default QoS control. Since the device corresponding to this method is the PCF entity in the default QoS control system of the embodiments of the disclosure and the principle solving the problem of this method is similar to that of the device, the implementations of this method may refer to the implementations of the device, and the repeated description thereof will be omitted here.

Figure 17:
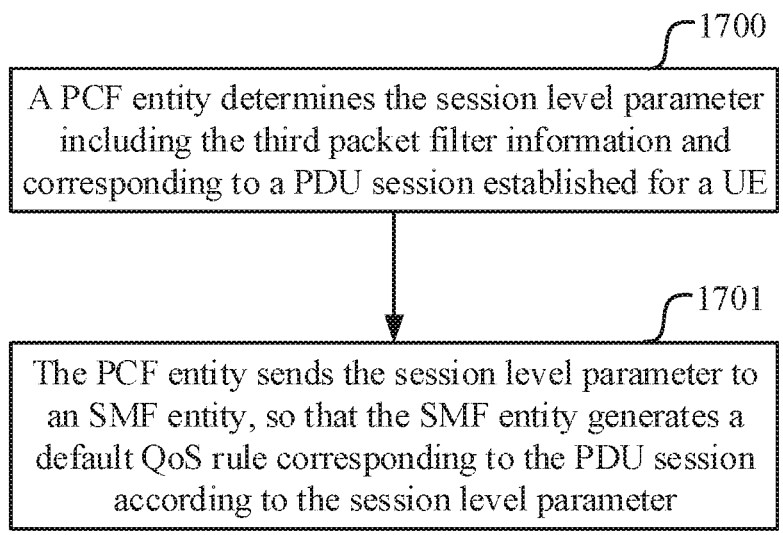
FIG. 17 is a schematic flow diagram of a fourth method for a default QoS control according to an embodiment of the disclosure.

As shown in FIG. 17, a fourth method for a default QoS control according to an embodiment of the disclosure includes the following steps.

Step 1700: a PCF entity determines the session level parameter including the third packet filter information and corresponding to a PDU session established for a UE.

Step 1701: the PCF entity sends the session level parameter to an SMF entity, so that the SMF entity generates a default QoS rule corresponding to the PDU session according to the session level parameter.

In one embodiment, the session level parameter further includes a part or all of: a fourth 5QI, a fourth ARP, third priority information.

In one embodiment, the PCF entity determines the third packet filter information in the session level parameter according to a part or all of: an identifier of the UE, DNN information accessed by the PDU session, subscription-related information of the UE, data model prediction information of the UE.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A method for a default Quality of Service (QoS) control, comprising:
   determining, by a Session Management Function (SMF) entity, a target Policy and Charging Control (PCC) rule from at least one PCC rule sent by a Policy Control Function (PCF) entity; wherein the PCC rule belongs to a Protocol Data Unit (PDU) session established for a User Equipment (UE) and the target PCC rule is an PCC rule of the at least one PCC rule;
   determining, by the SMF entity, a QoS Flow Identify (QFI) of a default QoS flow allocated for the PDU session; and
   generating, by the SMF entity, a default QoS rule corresponding to the PDU session according to the QFI of the default QoS flow and the target PCC rule, and sending the default QoS rule to the UE.

2. The method of claim 1, wherein the PCC rule comprises a part or all of:
   a first 5G QoS Indicator (5QI); a first Allocation and Retention Priority (ARP); first packet filter information; first priority information.

3. The method of claim 1, wherein the determining, by the SMF entity, the target PCC rule from at least one PCC rule sent by the PCF entity comprises:
   determining, by the SMF entity, a PCC rule carrying default indication information in the at least one PCC rule as the target PCC rule; or
   determining, by the SMF entity, a PCC rule with a lowest priority in the at least one PCC rule as the target PCC rule.

4. The method of claim 1, wherein before the SMF entity determines the target PCC rule from the at least one PCC rule sent by the PCF entity, the method further comprises:
   receiving, by the SMF entity, a session level parameter sent by the PCF entity;
   the determining, by the SMF entity, the target PCC rule from at least one PCC rule sent by the PCF entity, comprises:
   determining, by the SMF entity, a first type of information corresponding to the session level parameter in each PCC rule; and determining a PCC rule in which the first type of information is same as the session level parameter as the target PCC rule.

5. The method of claim 4, wherein the session level parameter comprises a second 5G QoS Indicator (5QI) and/or a second Allocation and Retention Priority (ARP);
   determining, by the SMF entity, the first type of information corresponding to the session level parameter in each PCC rule, comprises:
   determining, by the SMF entity, a first 5QI and/or a first ARP in each PCC rule as the first type of information.

6. The method of claim 1, wherein the default QoS rule comprises a part or all of:

a third 5G QoS Indicator (5QI) a third Allocation and Retention Priority (ARP), second packet filter information, second priority information, QFI of default QoS flow.

7. The method of claim 6, wherein the SMF entity generates the default QoS rule corresponding to the PDU session in a part or all of following ways:
   in a first way: the SMF entity determines the first 5QI in the target PCC rule as the third 5QI in the default QoS rule;
   in a second way: the SMF entity determines the first ARP in the target PCC rule as the third ARP in the default QoS rule;
   in a third way: the SMF entity determines the first packet filter information in the target PCC rule as the second packet filter information in the default QoS rule;
   in a fourth way: the SMF entity determines the first priority information in the target PCC rule as the second priority information in the default QoS rule;
   in a fifth way: the SMF entity determines the QFI of the default QoS flow as the QFI of the default QoS flow in the default QoS rule.

8. The method of claim 1, wherein after the SMF entity generates the default QoS rule corresponding to the PDU session according to the target PCC rule, the method further comprises:
   sending, by the SMF entity, the second packet filter information and the QFI of the default QoS flow to a UPF entity, so that the UPF entity transmits downlink data matching with the second packet filter information through the default QoS flow.

9. A non-transitory computer readable storage medium storing a computer program that, when executed by a processor, cause the process to perform the method of claim 1.

10. A method for a default quality of service control, comprising:
    determining, by a Policy Control Function (PCF) entity, at least one Policy and Charging Control (PCC) rule corresponding to a Protocol Data Unit (PDU) session established for a User Equipment, UE; and
    sending, by the PCF entity, the at least one PCC rule to a Session Management Function (SMF) entity, so that the SMF entity determines a target PCC rule from the at least one PCC rule and generates a default QoS rule corresponding to the PDU session according to the target PCC rule, wherein the target PCC rule is an PCC rule of the at least one PCC rule;
    wherein sending, by the PCF entity, the at least one PCC rule to the SMF entity, comprises:
    adding, by the PCF entity, default indication information to one of the at least one PCC rule, and sending the PCC rule including the default indication information and other PCC rules not including the default indication information to the SMF entity, so that the SMF entity determines the target PCC rule according to the default indication information.

11. The method of claim 10, wherein the PCC rule comprises a part or all of:
    a first 5G QoS Indicator (5QI); a first Allocation and Retention Priority (ARP); first packet filter information; first priority information.

12. The method of claim 11, wherein the PCF entity determines the first packet filter information in the PCC rule according to a part or all of:

an identifier of the UE, Data Network Name, DNN, information accessed by the PDU session, subscription-related information of the UE, data model prediction information of the UE.

13. The method of claim 10, wherein before the PCF entity sends the at least one PCC rule to the SMF entity, the method further comprises:
   determining, by the PCF entity, a session level parameter corresponding to the PDU session;
   sending, by the PCF entity, the at least one PCC rule to the SMF entity, comprises:
   sending, by the PCF entity, the at least one PCC rule and the session level parameter to the SMF entity, so that the SMF entity determines the target PCC rule according to the session level parameter.

14. The method of claim 13, wherein the session level parameter comprises a second 5G QoS Indicator (5QI) and/or a second Allocation and Retention Priority (ARP).

15. A non-transitory computer readable storage medium storing a computer program that, when executed by a processor, cause the process to perform the method of claim 10.

16. An Session Management Function (SMF) entity, comprising: a processor and a memory;
   wherein the processor is configured to read a program in the memory and perform:
   determining a target Policy and Charging Control (PCC) rule from at least one PCC rule sent by a Policy Control Function (PCF) entity, wherein the PCC rule belongs to a Protocol Data Unit (PDU) session established for a User Equipment (UE), and the target PCC rule is an PCC rule of the at least one PCC rule;
   determining, by the SMF entity, a QoS Flow Identify (QFI) of a default QoS flow allocated for the PDU session;
   and generating a default Quality of Service (QoS) rule corresponding to the PDU session according to the QFI of the default QoS flow and the target PCC rule, and sending the default QoS rule to the UE.

17. The SMF entity of claim 16, wherein the PCC rule comprises a part or all of:
   a first 5G QoS Indicator (5QI) a first Allocation and Retention Priority (ARP), first packet filter information, first priority information.

18. A Policy Control Function (PCF) entity, comprising: a processor and a memory;
   wherein the processor is configured to read a program in the memory to:
   determine at least one Policy and Charging Control (PCC) rule corresponding to a Protocol Data Unit (PDU) session established for a User Equipment (UE);
   send the at least one PCC rule to an Session Management Function (SMF) entity, so that the SMF entity determines a target PCC rule from the at least one PCC rule; and
   generate a default Quality of Service (QoS) rule corresponding to the PDU session according to the target PCC rule, wherein the target PCC rule is an PCC rule of the at least one PCC rule;
   wherein the processor is further configured to read a program in the memory to:
   add default indication information to one of the at least one PCC rule, and send the PCC rule including the default indication information and other PCC rules not including the default indication information to the SMF entity, so that the SMF entity determines the target PCC rule according to the default indication information.

* * * * *